2,946,803
Patented July 26, 1960

2,946,803

1-METHYL-5(2′,2′-DIPHENYL-3′-ETHYL-4′-FURYL-METHYL)-IMIDAZOLE AND SALTS AND LOWER ALKYL QUATERNARIES

Harold E. Zaugg, Lake Forest, and Robert W. De Net, Waukegan, Ill., assignors to Abbott Laboratories, North Chicago, Ill., a corporation of Illinois No Drawing. Filed Dec. 29, 1958, Ser. No. 783,087

5 Claims. (Cl. 260—309)

This invention relates to a novel alkaloid derivative, particularly, a diaryl derivative of pilocarpine. The chemical formula for pilocarpine is:

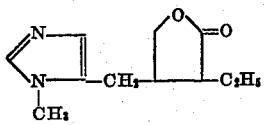

Pilocarpine contains a lactone ring which is functionally reacted with a Grignard reagent to produce a derivative thereof. The novel compound of this invention is prepared by reacting pilocarpine with a phenyl Grignard reagent to yield the glycol:

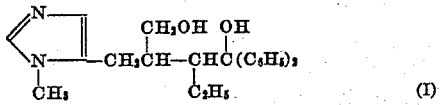

to which is assigned the chemical name, 1-methyl-5-(3′-ethyl-4′-hydroxy-2′-hydroxymethyl-4′,4′ - diphenylbutyl)-imidazole. This glycol, in turn, is converted to an optically active hydrochloride salt and, thereafter, dehydrated to form the novel diphenyl tetrahydrofuran derivative:

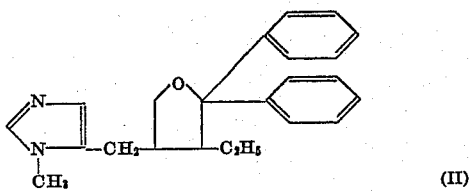

to which is assigned the chemical name, 1-methyl-5-(2′,2′-diphenyl-3′-ethyl-4′-furylmethyl)-imidazole.

The tetrahydrofuran derivative possesses marked properties as a hypothermic agent and as a potentiator for central depressing drugs, particularly, barbiturates.

It will be apparent that the compound represented by II contains a basic tertiary nitrogen in the imidazole moiety, therefore, providing a situs for acid addition and quaternary ammonium salts. The acid addition salts may be formed with a variety of inorganic acids such as sulfuric, phosphoric, hydrochloric, hydrobromic, hydriodic, sulfamic and like acids. Strongly organic acids may also be used such as citric, lactic, maleic, malic, succinic, tartaric, cinnamic, acetic, benzoic, gluconic, ascorbic, cyclohexylsulfamic and related acids. The quaternary ammonium salts can be formed by the addition of alkyl halides such as chlorides and bromides of methyl, ethyl, propyl, isopropyl, allyl and isobutyl alkyls.

The following examples are presented to teach the preparation of the compound of this invention, but such examples are not intended to represent an exclusive embodiment thereof.

EXAMPLE I

*1-methyl-5-(3′-ethyl-4′-hydroxy-2′-hydroxymethyl-4′,4′-diphenylbutyl)-imidazole*

To a solution of phenylmagnesium bromide in ether prepared from 37.7 g. (0.24 mole) of bromobenzene and 5.75 g. (0.24 mole) of magnesium is added, in portions, 15 g. (0.06 mole) of powdered pilocarpine hydrochloride. The mixture is stirred and refluxed overnight and decomposed with aqueous ammonium chloride solution. The free base, insoluble in ether, is collected at the filter to give, after recrystallization from dry ethanol, 14.3 g. (65%) of the glycol I, M.P. 285–288° dec., and one recrystallization gives a M.P. of 291–293°. dec.

*Analysis.*—Calcd. for $C_{23}H_{28}N_2O_2$: C, 75.79%; H, 7.74%; N, 7.68%. Found: C, 75.85%; H, 7.71%; N, 7.50%.

The hydrochloride salt of the base of Example I is prepared from isopropyl alcohol-ether, M.P. 137–139° dec. The specific rotation, $[\alpha]_D^{27}$, of the hydrochloride is $-145°$ (c=0.008 g./ml.; $H_2O$).

*Analysis.*—Calcd. for $C_{23}H_{29}ClN_2O_2$: C, 68.90%; H, 7.29%; N, 6.98%. Found: C, 68.78%; H, 7.73%; N, 6.85%.

EXAMPLE II

*1-methyl-5-(2′,2′-diphenyl-3′-ethyl-4′-furylmethyl)-imidazole*

A solution of 3.6 g. of the glycol I in 30 ml. of glacial acetic acid containing 10 ml. of concentrated hydrochloric acid is refluxed for 2 hours. The mixture is concentrated to dryness under reduced pressure, the residue is dissolved in water and the solution is made strongly alkaline with saturated aqueous potassium carbonate. The liberated base is taken up in ether and dried over anhydrous magnesium sulfate. Filtration and removal of the ether by distillation gives an oil which cannot be crystallized. It is taken up in ether and treated with ethereal hydrogen chloride. Recrystallization of the resulting salt from an ethanol-ether mixture gives 2 g. of 1-methyl-5-(2′,2′-diphenyl-3′-ethyl-4′-furylmethyl)-imidazole hydrochloride, M.P. 254–256°, $[\alpha]_D^{27}$ +156° (c=0.01 g./ml.; $H_2O$).

*Analysis.*—Calcd. for $C_{23}H_{27}ClN_2O$: C, 72.14%; H, 7.11%; N, 7.32%. Found: C, 72.10%; H, 6.91%; N, 7.40%.

The monomethiodide salt of the base prepared by the procedure of Example II is formed by dissolving said base in methyl ethyl ketone and adding thereto excess methyl iodide. The precipitated salt is recrystallized from ethanol and has a molecular weight of 524.5.

The foregoing examples present the selected Grignard reagent as phenylmagnesium bromide. However, it is apparent to those skilled in the art that phenylmagnesium halides other than the bromide are operable to prepare the novel tetrahydrofuran form of pilocarpine.

Others may practice the invention in any of the numerous ways which will be suggested by this disclosure to one skilled in the art. All such practice of the invention is considered to be a part hereof provided it falls within the scope of the appended claims.

We claim:

1. 1-methyl-5-(2′,2′-diphenyl - 3′-ethyl-4′-furylmethyl)-imidazole.
2. 1-methyl-5-(2′,2′-diphenyl - 3′-ethyl-4′-furylmethyl)-imidazole hydrochloride.
3. 1-methyl-5-(2′,2′-diphenyl - 3′-ethyl-4′-furylmethyl)-imidazole monomethiodide.
4. A compound selected from the group consisting of bases of the formula:

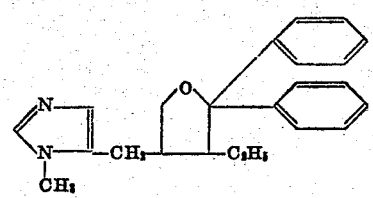

the non-toxic acid addition salts thereof and the non-toxic lower alkyl quaternary ammonium salt thereof.

5. A process for preparing a compound selected from the class consisting of bases of the formula:

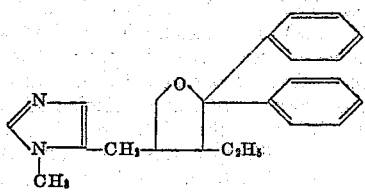

which comprises adding the compound:

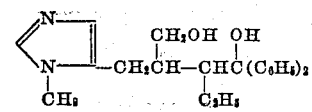

to a mixture of about three parts glacial acetic acid and about one part of concentrated hydrochloric acid and refluxing the resulting mixture for about two hours.

No references cited.